United States Patent
Shi et al.

(10) Patent No.: US 8,205,310 B2
(45) Date of Patent: Jun. 26, 2012

(54) BATTERY COVER LATCH ASSEMBLY

(75) Inventors: Zheng Shi, Shenzhen (CN); Chih-Chiang Chang, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 638 days.

(21) Appl. No.: 12/335,613

(22) Filed: Dec. 16, 2008

(65) Prior Publication Data
US 2009/0260202 A1 Oct. 22, 2009

(30) Foreign Application Priority Data

Apr. 18, 2008 (CN) .......................... 2008 1 0301200

(51) Int. Cl.
*E05C 1/08* (2006.01)
(52) U.S. Cl. ....... 24/637; 429/97; 429/100; 361/679.09; 292/163; 292/8; 292/179
(58) Field of Classification Search .................. 292/216; 24/637; 224/218; 439/500
See application file for complete search history.

(56) References Cited

U.S. PATENT DOCUMENTS

| 5,077,994 | A | * | 1/1992 | Trull et al. ...................... 70/224 |
| 5,895,729 | A | * | 4/1999 | Phelps et al. .................... 429/97 |
| 6,171,138 | B1 | * | 1/2001 | Lefebvre et al. .............. 439/500 |
| 7,309,253 | B2 | * | 12/2007 | Ge et al. ......................... 439/500 |
| 7,510,345 | B2 | * | 3/2009 | Kosh et al. .................... 403/330 |
| 7,647,079 | B2 | * | 1/2010 | Zuo et al. .................. 455/575.1 |
| 7,780,047 | B2 | * | 8/2010 | Chen et al. .................... 224/218 |
| 7,813,112 | B2 | * | 10/2010 | Ge et al. ........................ 361/679.01 |
| 2007/0122693 | A1 | * | 5/2007 | Qin et al. ........................ 429/97 |
| 2007/0296225 | A1 | * | 12/2007 | Ashton et al. ................. 292/163 |

FOREIGN PATENT DOCUMENTS

CN 2831701 Y 10/2006

* cited by examiner

*Primary Examiner* — Thomas Beach
*Assistant Examiner* — Sajid R Ansari
(74) *Attorney, Agent, or Firm* — Altis Law Group, Inc.

(57) ABSTRACT

A battery cover latch assembly (10) used in a portable electronic device is described. The battery cover latch assembly (10) includes a cover member (12), a body member (11) including at least one first latch (117), a button (13) including at least one second latch (1312), a button housing (14) mounted to the cover member (12). The button (13) is slidably received in the button housing (14). The second latch (1312) detachably engages with the first latch (117) when the button (13) slides in the button housing (14).

1 Claim, 5 Drawing Sheets

BATTERY COVER LATCH ASSEMBLY

BACKGROUND

1. Field of the Invention

The present invention generally relates to battery cover latch assemblies and, particularly, to a battery cover latch assembly for a portable electronic device.

2. Description of Related Art

Battery cover latch assemblies are typically used to latch battery covers to housings of portable electronic devices.

A typical battery cover latch assembly may include a cover member, a body member, an elastic locking protrusion and a locking slot. The locking protrusion can be biased into the locking slot to latch the cover member to the body member.

However, removal of the cover member may require a strong force, which may damage the elastic locking protrusion.

Therefore, there is room for improvement within the art.

BRIEF DESCRIPTION OF THE DRAWINGS

Many aspects of the battery cover latch assembly can be better understood with reference to the following drawings. These drawings are not necessarily drawn to scale, the emphasis instead being placed upon clearly illustrating the principles of the present battery cover latch assembly. Moreover, in the drawings like reference numerals designate corresponding sections throughout the several views.

DETAILED DESCRIPTION OF EXEMPLARY EMBODIMENT

Figure 1:
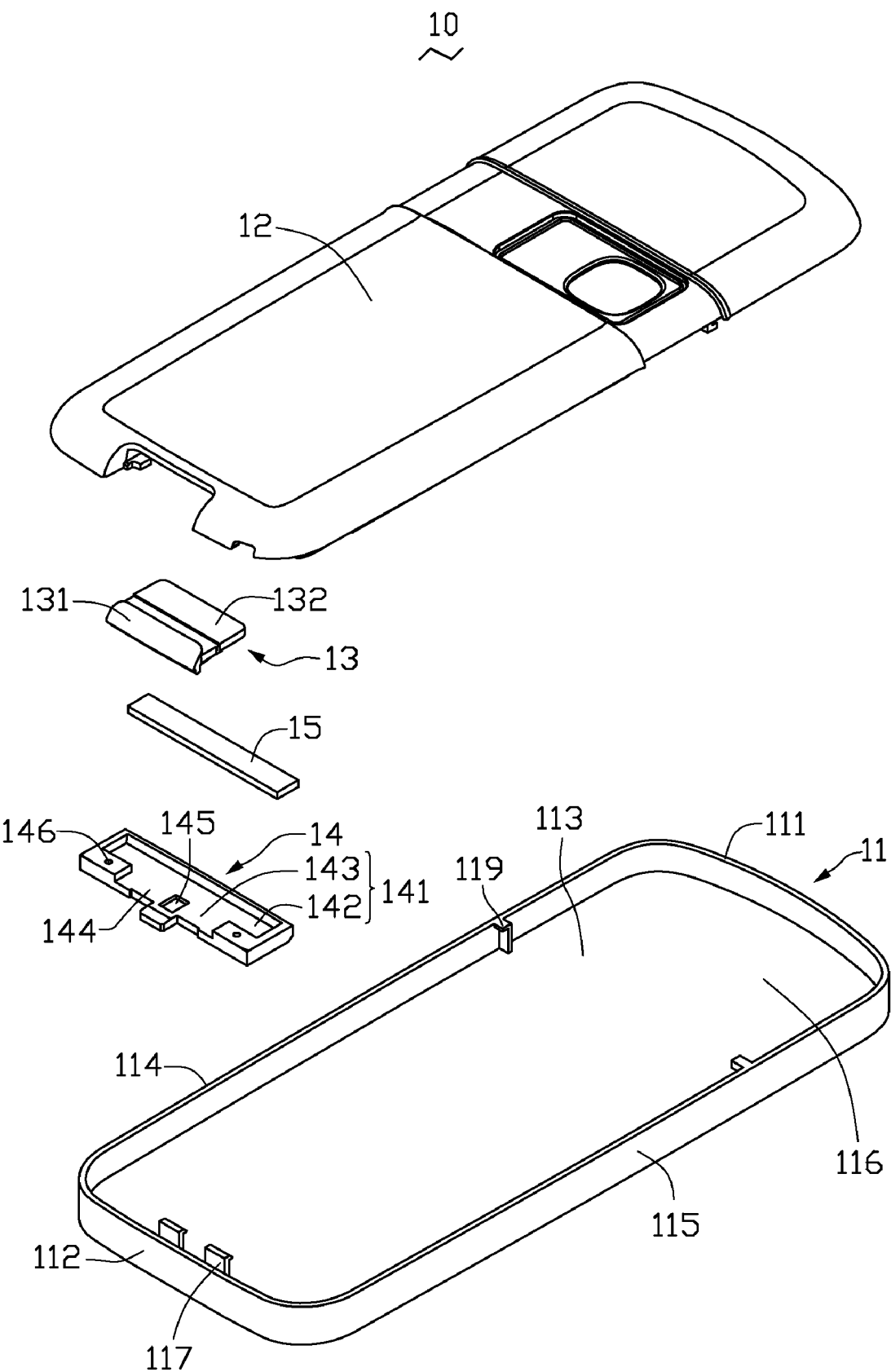
FIG. 1 is an exploded, isometric view of a battery cover latch assembly, in accordance with an exemplary embodiment.
Figure 2:
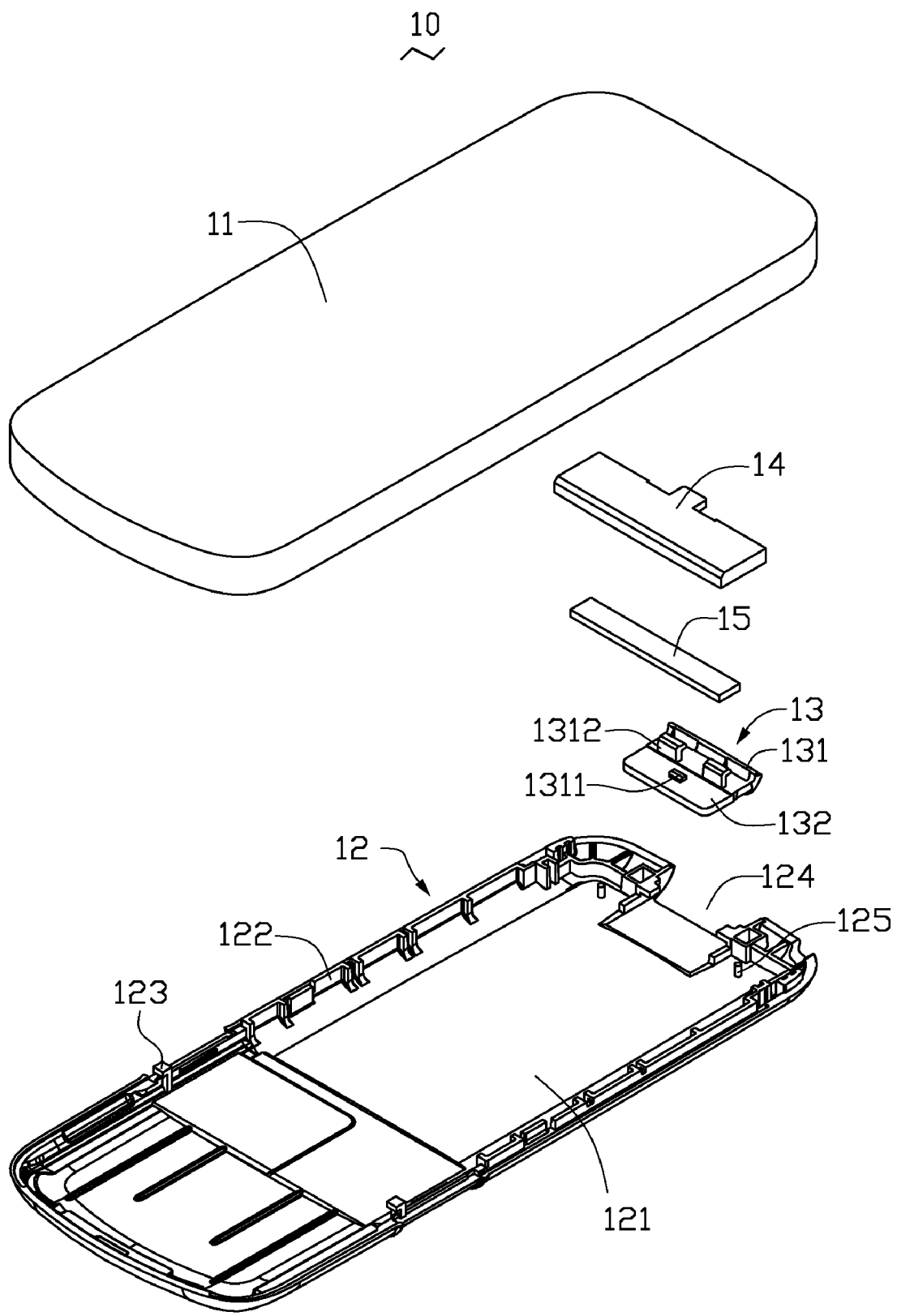
FIG. 2 is another exploded, isometric view of the battery cover latch assembly shown in FIG. 1.
Figure 3:
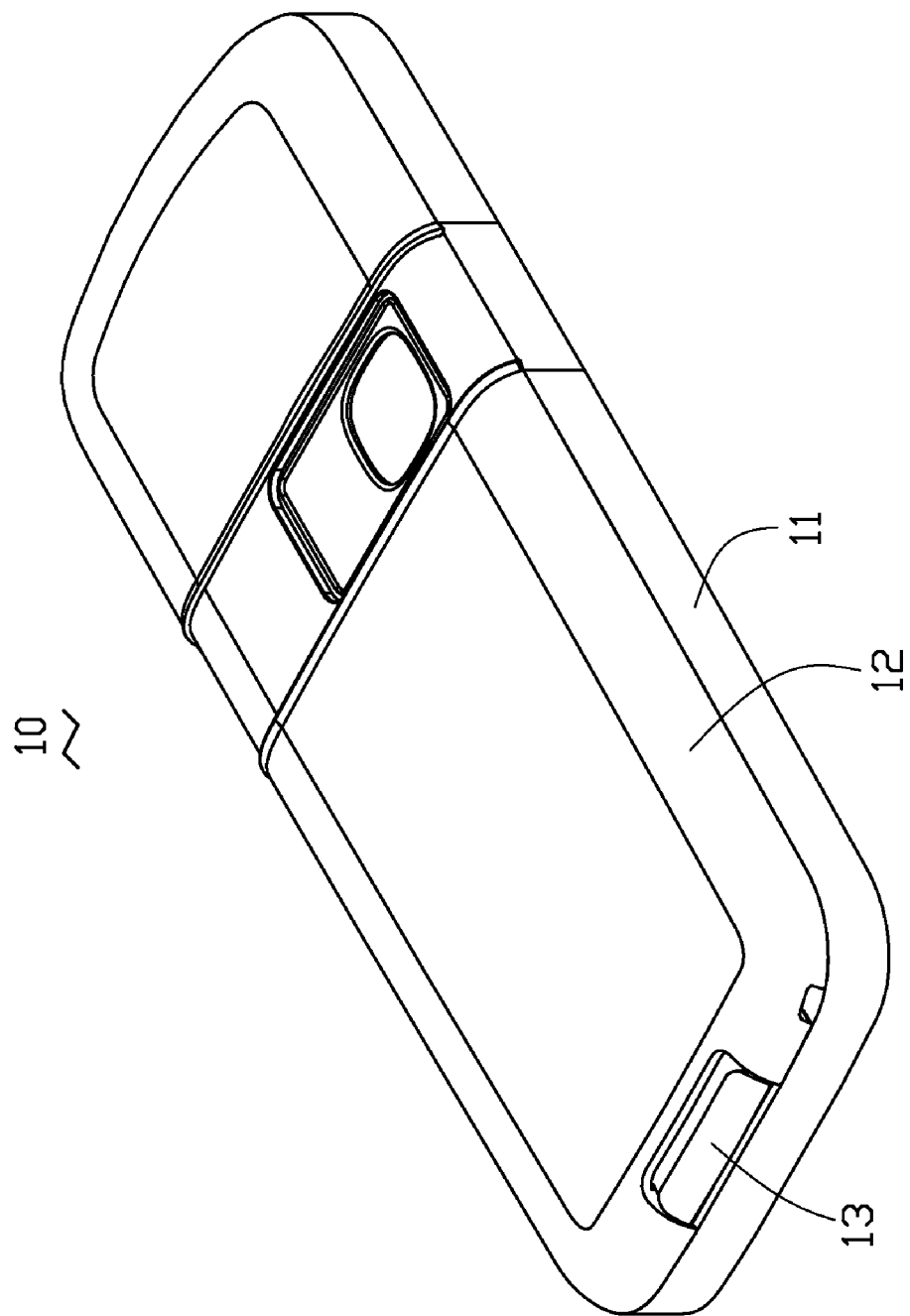
FIG. 3 is an assembled, isometric view of the battery cover latch assembly shown in FIG. 1.

FIGS. 1 through 3 show an exemplary battery cover latch assembly 10 including a body member 11, a cover member 12, a button 13, a button housing 14 and an elastic member 15. The cover member 12 can be detachably mounted with the body member 11 via the button 13, the button housing 14 and the elastic member 15.

The body member 11 includes an upper portion 111, a lower portion 112, a bottom portion 113 and two opposite side portions 114 and 115. The upper portion 111, the lower portion 112, the bottom portion 113 and the two side portions 114 and 115 enclose an accommodating space 116. The accommodating space 116 is used to receive a battery (not shown). Two elastic, L-shaped first latches 117 protrude from the bottom portion 113 and are adjacent to the lower portion 112. Each of the two side portions 114 and 115 forms a limiting block 119 adjacent to the upper portion 111.

The cover member 12 includes a bottom wall 121 and a peripheral wall 122. Two L-shaped limiting clasps 123 respectively protrude from opposite sides of the bottom wall 121 and are adjacent to the peripheral wall 122. The two limiting clasps 123 are configured to engage with the corresponding limiting blocks 119. The peripheral wall 122 defines a cutout 124 used to facilitate insertion of the button 13. The bottom wall 121 forms two securing poles 125 at opposite sides of the cutout 124.

The button 13 includes a pressing board 131 and a sliding board 132. The sliding board 132 perpendicularly connects to the pressing board 131. The sliding board 132 includes a sliding block 1311 and two elastic, L-shaped second latches 1312 protruding from one side facing the elastic member 15. The second latches 1312 are defined between the pressing board 131 and the sliding block 1311 in the same side of the sliding board 132 as the sliding block 1311. The second latches 1312 are configured to latch to the corresponding first latches 117.

The button housing 14 is generally rectangular. The button housing 14 defines a T-shaped groove 141 including a first groove section 142 and a second groove section 143. The second groove section 143 communicates with the first groove section 142. The first groove section 142 is used to receive the elastic member 15. The second groove section 143 is used to slidably receive the sliding board 132. The bottom wall of the first groove 142 defines a sliding slot 145. The sliding block 1311 is slidably received in the sliding slot 145. Two securing holes 146 are defined in the same side of the button housing 14 as the groove 141. The securing holes 146 are aligned and engaged with the securing poles 125.

The elastic member 15 can be a rectangular elastic board made of an elastic material (e.g., rubber or ducked cotton). The elastic member 15 is deformably received in the first groove section 142, with one end of the elastic member 15 abutting against the button housing 14 and the other end abutting against the sliding board 132.

Figure 4:
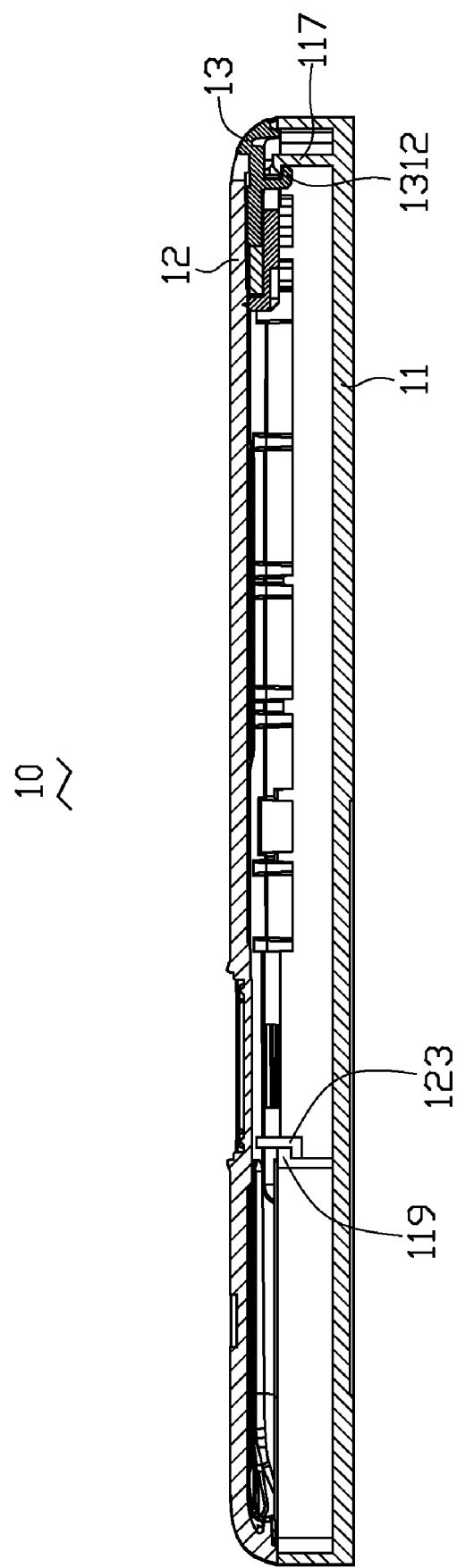
FIG. 4 is a cross-sectional view of the battery cover latch assembly shown in FIG. 1.
Figure 5:
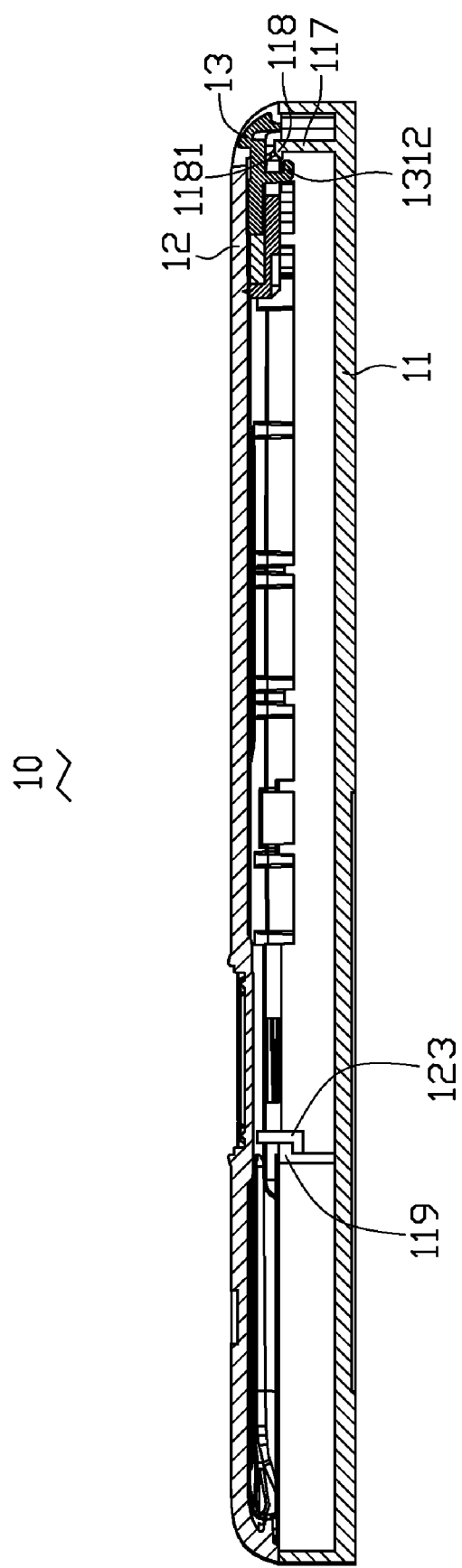
FIG. 5 is a cross-sectional view showing the detachment of the battery cover latch assembly shown in FIG. 4.

Referring to FIGS. 4 and 5, to latch the cover member 12 to the body member 11, the limiting clasps 123 are clasped to the limiting blocks 119. Then the cover member 12 can be pivoted towards the body member 11 until the first latches 117 bias to interlock with the second latches 1312.

To release the cover member 12 from the body member 11, the button 13 is pressed towards the first groove section 142 until the first latches 117 detach from the second latches 1312.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A battery cover latch assembly, comprising:
    a cover member;
    a body member including at least one first latch;
    a button including at least one second latch; and
    a detachable button housing mounted to the cover member;
    an elastic member, being a rectangular elastic board including a first side surface, a second side surface, a top surface and a bottom surface;
    wherein the button housing defines a T-shaped groove including a first groove section and a second groove section communicating each other, the elastic member is deformably received in the first groove section, the bottom surface contacts the button housing, and the top surface contacts the cover member, the first side surface abuts against the button housing, the second side surface abuts against the button, wherein the button is slidably received in the second groove section, the button presses the second side surface, the second latch detachably engages with the first latch when the button slides in the button housing.

wherein the bottom wall of the second groove section defines a sliding slot lying in a plane substantially parallel to the plane of the cover member, the button includes a sliding block, the sliding block is slidably received in the sliding slot to guide the movement of the button along the plane substantially parallel to the plane of the cover member.

* * * * *